United States Patent
Wong et al.

(10) Patent No.: US 7,783,692 B1
(45) Date of Patent: Aug. 24, 2010

(54) FAST FLAG GENERATION

(75) Inventors: Wing-Shek Wong, Austin, TX (US);
Michael E. Tuuk, Round Rock, TX (US); Teik-Chung Tan, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1449 days.

(21) Appl. No.: 11/175,083

(22) Filed: Jul. 5, 2005

(51) Int. Cl.
*G06F 7/00* (2006.01)

(52) U.S. Cl. .................. 708/209; 708/200; 708/204; 708/205

(58) Field of Classification Search .......... 708/200–209
See application file for complete search history.

(56) References Cited

U.S. PATENT DOCUMENTS

| 4,907,176 | A |   | 3/1990 | Bahnick et al. |
|-----------|---|---|--------|----------------|
| 5,862,065 | A |   | 1/1999 | Muthusamy |
| 5,896,305 | A | * | 4/1999 | Bosshart et al. ............. 708/209 |
| 6,122,651 | A | * | 9/2000 | Mahurin ..................... 708/209 |
| 6,912,560 | B2 |   | 6/2005 | Goldovsky |

\* cited by examiner

*Primary Examiner*—Lewis A Bullock, Jr.
*Assistant Examiner*—Michael Yaary
(74) *Attorney, Agent, or Firm*—Meyertons, Hood, Kivlin, Kowert & Goetzel, P.C.; Erik A. Heter

(57) ABSTRACT

A method and circuit for fast flag generation. The circuit is coupled to receive data to be shifted, the data including a first plurality of bits. A shift count value (including a second plurality of bits) is also received by the circuit, as well as an indication of a direction the data is to be shifted. Based on the shift count value and the indication of direction, the position of a bit within the data is determined. The bit is then output as a flag bit.

17 Claims, 3 Drawing Sheets

FAST FLAG GENERATION

BACKGROUND OF THE INVENTION

1. Field of the Invention

This invention relates to computer systems, and more particularly, to circuits for generating flag bits.

2. Description of the Related Art

Modern microprocessors utilize binary shifters for many functions. In many processors, a binary shifter may be in the main execution path (or paths for processors having multiple execution paths). When a shifter is placed in the main execution path, a low gate delay is essential to prevent the shifter from becoming the critical timing path in the execution unit. Advances in binary adders have reduced the delay that adders in the execution unit, thus increasing the relative contribution of the shifter delay. The problem of delay is further compounded by the implementation of wider data paths (e.g., 64 bits).

In processor architectures that utilize shifters in the execution path, the shifters may perform generic functions such as right/left shifts and right/left rotates. Many processor architectures require the operations to be performed on varying data sizes. Often times, flag generation is required with the same timing as the data result with such operations.

In many shifters, the generation of a carry flag dictates its critical timing path since, in a traditional implementation, the shift is performed prior to the generation of the carry flag. In such an implementation, the flag bit is the last bit shifted out in the particular direction of the shift. Once the shift has been completed, the carry flag must be selected from the proper bit position (depending on the size of the data shifted, which may be less than the maximum operand size of the shifter.) and from the most significant bit or least significant bit (depending on the direction of the shift). Typical implementations utilize multiplexers, which may be slow due to the signal path required for the bit that is to be shifted out as the flag bit, and this signal path may vary for different operand sizes and the shift direction. Thus, buffer stages may be required to drive a critical signal (i.e. the signal representing the flag bit) across a long distance.

SUMMARY OF THE INVENTION

A method and circuit for fast flag generation is disclosed. In one embodiment, a circuit is coupled to receive data to be shifted, the data including a first plurality of bits. A shift count value (including a second plurality of bits) is also received by the circuit, as well as an indication of a direction the data is to be shifted. Based on the shift count value and the indication of direction, the position of a bit within the data is determined. The bit is then output as a flag bit.

In one embodiment, a circuit for fast flag generation includes a plurality of selection circuits, a subset of which coupled to receive the data to be shifted. A position circuit is coupled to receive the shift count value. The position circuit includes first and second logic circuits. The first logic circuit configured to invert the bits of the shift count value and, following the inversion, add a value of binary 1. The second logic circuit is configured to subtract a value of binary 1 from the shift count values. The position circuit also includes a selection circuit coupled to receive a signal indicating whether the data is to be shifted leftward or rightward. If the data is to be shifted leftward, the selection circuit selects the output from the first logic circuits, while the output from the second logic circuit is selected if the data is to be shifted rightward. The position circuit may then provide either the output from the first logic circuit or the output from the second logic circuit (in the form of selection signals) to the plurality of selection circuits. In some embodiments, higher order bits of the selection signals may be masked if the operand size of the data to be shifted is less than its maximum operand size. The selection signals, which serve as an indication of the bit position (within the data to be shifted) of a flag bit, are used to select the bit from the data to be shifted. Once selected, this bit is output as the flag bit.

BRIEF DESCRIPTION OF THE DRAWINGS

Other aspects of the invention will become apparent upon reading the following detailed description and upon reference to the accompanying drawings in which.

Figure 1:
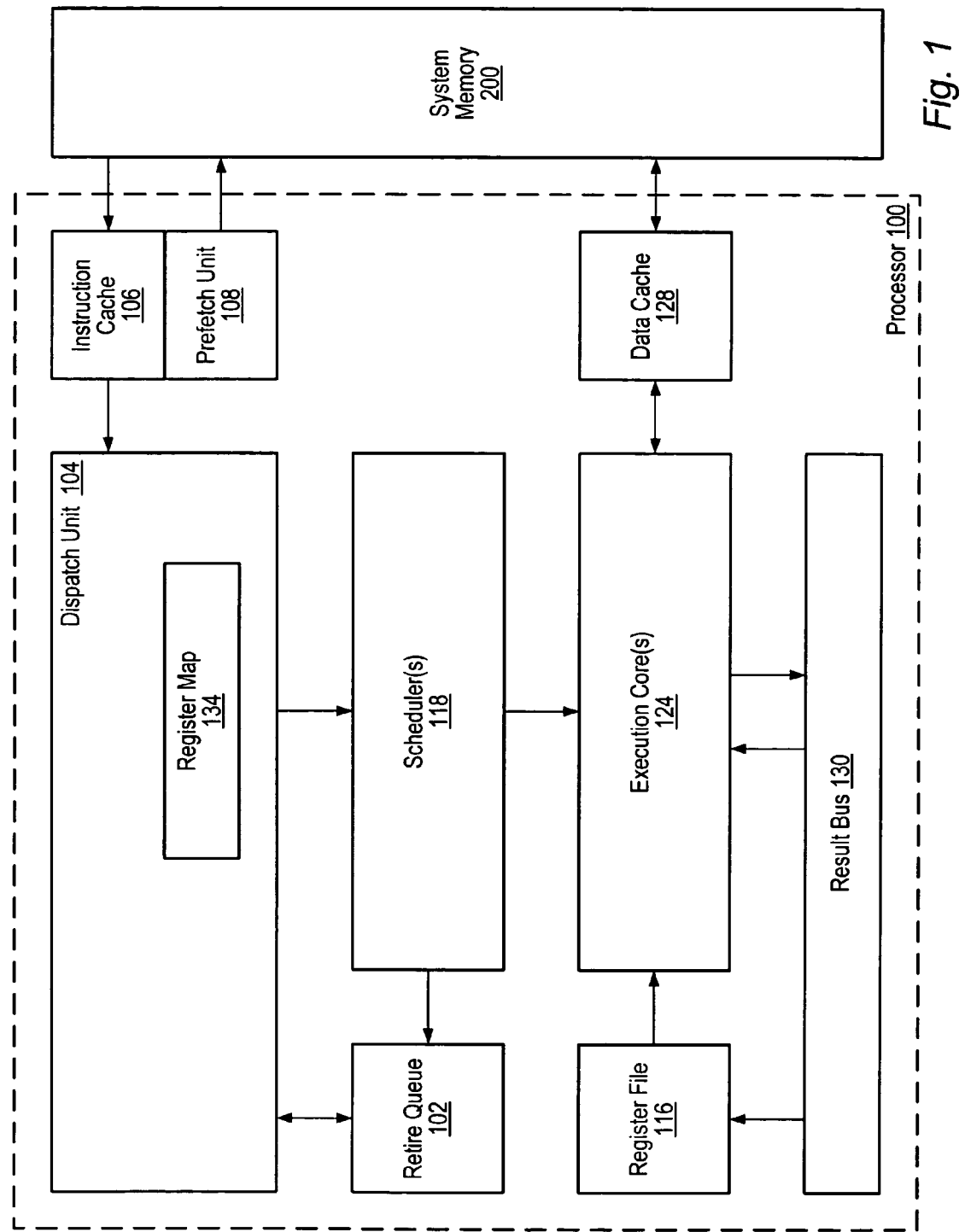
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Processor Overview

FIG. 1 is a block diagram of one embodiment of a processor 100. The processor 100 is configured to execute instructions stored in a system memory 200. Many of these instructions operate on data stored in the system memory 200. It is noted that the system memory 200 may be physically distributed throughout a computer system and/or may be accessed by one or more processors 100.

In the illustrated embodiment, the processor 100 may include an instruction cache 106 and a data cache 128. The processor 100 may include a prefetch unit 108 coupled to the instruction cache 106. A dispatch unit 104 may be configured to receive instructions from the instruction cache 106 and to dispatch operations to the scheduler(s) 118. One or more of the schedulers 118 may be coupled to receive dispatched operations from the dispatch unit 104 and to issue operations to the one or more execution cores 34. The execution core(s) 124 may include one or more integer units, one or more floating point units, and one or more load/store units. Results generated by the execution core(s) 124 may be output to one or more result buses 130 (a single result bus is shown here for clarity, although multiple result buses are possible and contemplated). These results may be used as operand values for subsequently issued instructions and/or stored to the register file 116. A retire queue 102 may be coupled to the scheduler(s) 118 and the dispatch unit 104. The retire queue 102 may be configured to determine when each issued operation may be retired.

In one embodiment, the processor 100 may be designed to be compatible with the x86 architecture (also known as the Intel Architecture-32, or IA-32). In another embodiment, the processor 100 may be compatible with a 64-bit architecture.

Embodiments of processor 100 compatible with other architectures are contemplated as well.

Note that the processor 100 may also include many other components. For example, the processor 100 may include a branch prediction unit (not shown).

The instruction cache 106 may store instructions for fetch by the dispatch unit 104. Instruction code may be provided to the instruction cache 106 for storage by prefetching code from the system memory 200 through the prefetch unit 108. Instruction cache 106 may be implemented in various configurations (e.g., set-associative, fully-associative, or direct-mapped).

The prefetch unit 108 may prefetch instruction code from the system memory 200 for storage within the instruction cache 106. The prefetch unit 108 may employ a variety of specific code prefetching techniques and algorithms.

The dispatch unit 104 may output operations executable by the execution core(s) 124 as well as operand address information, immediate data and/or displacement data. In some embodiments, the dispatch unit 104 may include decoding circuitry (not shown) for decoding certain instructions into operations executable within the execution core(s) 124. Simple instructions may correspond to a single operation. In some embodiments, more complex instructions may correspond to multiple operations. Upon decode of an operation that involves the update of a register, a register location within register file 116 may be reserved to store speculative register states (in an alternative embodiment, a reorder buffer may be used to store one or more speculative register states for each register and the register file 116 may store a committed register state for each register). A register map 134 may translate logical register names of source and destination operands to physical register numbers in order to facilitate register renaming. The register map 134 may track which registers within the register file 116 are currently allocated and unallocated.

The processor 100 of FIG. 1 may support out of order execution. The retire queue 102 may keep track of the original program sequence for register read and write operations, allow for speculative instruction execution and branch misprediction recovery, and facilitate precise exceptions. In some embodiments, the retire queue 102 may also support register renaming by providing data value storage for speculative register states (e.g. similar to a reorder buffer). In other embodiments, the retire queue 102 may function similarly to a reorder buffer but may not provide any data value storage. As operations are retired, the retire queue 102 may deallocate registers in the register file 116 that are no longer needed to store speculative register states and provide signals to the register map 134 indicating which registers are currently free. By maintaining speculative register states within the register file 116 (or, in alternative embodiments, within a reorder buffer) until the operations that generated those states are validated, the results of speculatively-executed operations along a mispredicted path may be invalidated in the register file 116 if a branch prediction is incorrect.

In one embodiment, a given register of register file 116 may be configured to store a data result of an executed instruction and may also store one or more flag bits that may be updated by the executed instruction. Flag bits may convey various types of information that may be important in executing subsequent instructions (e.g. indicating a carry or overflow situation exists as a result of an addition or multiplication operation. Architecturally, a flags register may be defined that stores the flags. Thus, a write to the given register may update both a logical register and the flags register. It should be noted that not all instructions may update the one or more flags.

The register map 134 may assign a physical register to a particular logical register (e.g. architected register or microarchitecturally specified registers) specified as a destination operand for an operation. The dispatch unit 104 may determine that the register file 116 has a previously allocated physical register assigned to a logical register specified as a source operand in a given operation. The register map 134 may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus (for result forwarding and/or storage in the register file 116) through a load/store unit (not shown). Operand data values may be provided to the execution core(s) 124 when the operation is issued by one of the scheduler(s) 118. Note that in alternative embodiments, operand values may be provided to a corresponding scheduler 118 when an operation is dispatched (instead of being provided to a corresponding execution core 124 when the operation is issued).

As used herein, a scheduler is a device that detects when operations are ready for execution and issues ready operations to one or more execution units. For example, a reservation station may be one type of scheduler. Independent reservation stations per execution core may be provided, or a central reservation station from which operations are issued may be provided. In other embodiments, a central scheduler which retains the operations until retirement may be used. Each scheduler 118 may be capable of holding operation information (e.g., the operation as well as operand values, operand tags, and/or immediate data) for several pending operations awaiting issue to an execution core 34. In some embodiments, each scheduler 118 may not provide operand value storage. Instead, each scheduler may monitor issued operations and results available in the register file 116 in order to determine when operand values will be available to be read by the execution core(s) 124 (from the register file 116 or the result bus 130).

Figure 2:
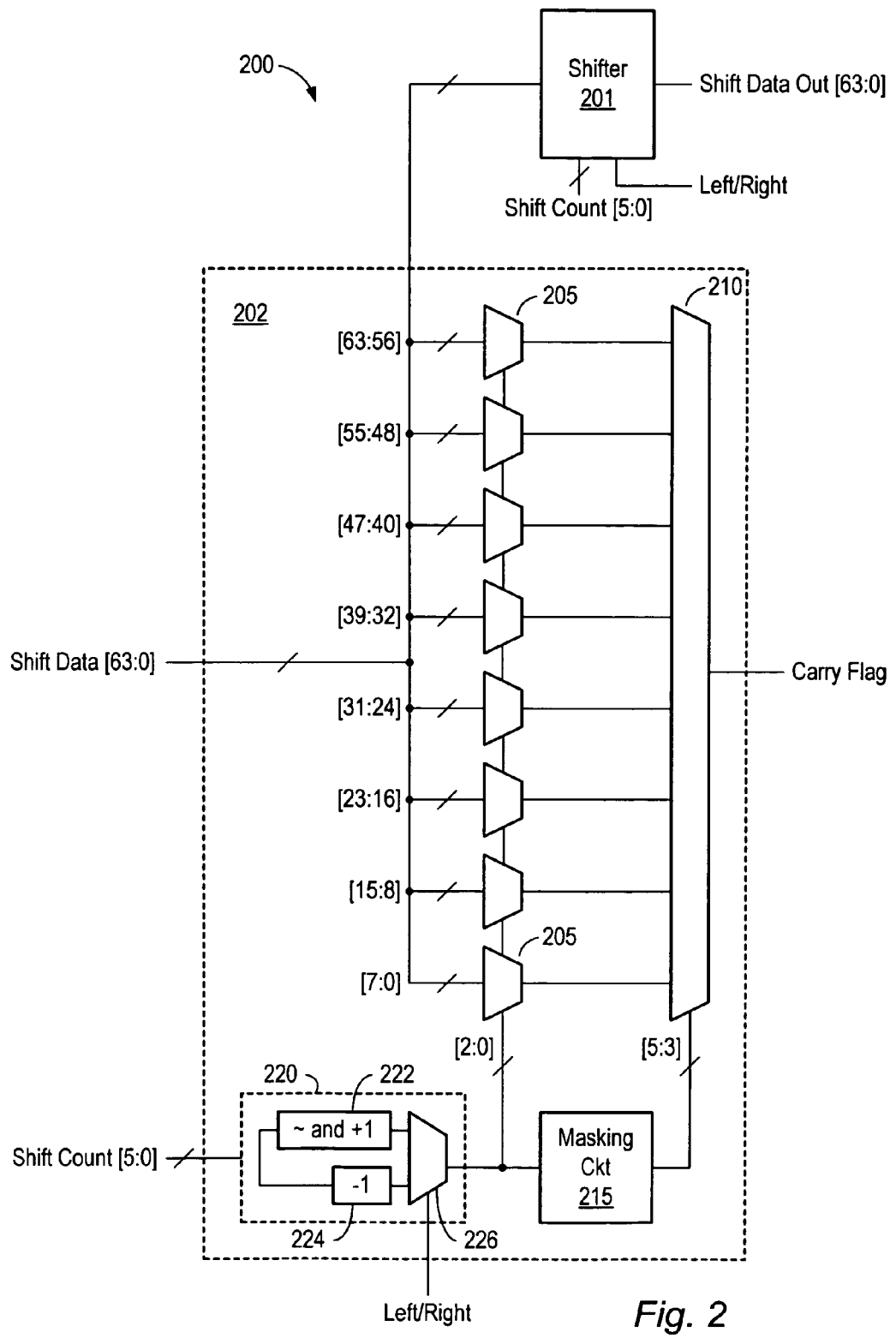
FIG. 2 is a block diagram of one embodiment of a circuit for fast flag generation.

FIG. 2 is a bock diagram of one embodiment of a circuit for fast flag generation. In the embodiment shown, circuit 200 includes flag generation circuit 202 and shifter 201. Circuit 200 is coupled to receive a plurality of data bits designated as shift data. The data is designated as such due to the requirement that it be shifted a certain number of bit positions. In the embodiment shown, the shift data has a maximum operand size of 64 bits, although operands of smaller sizes (e.g., 32 bits, 16 bits, etc.) may be input into the circuit as well. It is also noted that in other embodiments, both shifter 201 and flag generation circuit 202 may be configured to handle shift data with a larger operand size.

In addition to being coupled to receive shift data, both shifter 201 and flag generation circuit 202 are coupled to receive a shift count and a left/right signal. More particularly, the component of flag generation circuit 202 that receives the shift count value and left/right indication is position circuit 220. The shift count value (which, in this embodiment, includes 6 bits) indicates the number of bit positions the data is to be shifted, while the left/right signal is an indication of the direction that the data is to be shifted.

Position circuit 220 includes a first logic circuit 222, a second logic circuit 224, and a selection circuit 226. Both of the logic circuits are coupled to receive the shift count value. First logic circuit 222 is configured to determine the bit position within the shift data of a flag bit in the case where the data is to be shifted in a leftward direction. Second logic circuit 224 is configured to determine the bit position within the shift data of the flag bit in the case where the data is to be shifted in a rightward direction.

First logic circuit 222 is configured to determine the bit position of the flag bit by inverting each bit of the shift count value and adding a value of binary 1. For example, assume the shift count value received by first logic circuit 222 is the binary value 000101 (decimal 5). This indicates that the data is to be shifted 5 bit positions. To determine the bit position of the carry flag in this embodiment, first logic circuit first inverts each bit of the shift count value, producing a binary value of 111010 (decimal 58). Following the inversion, a value of binary 1 is added, producing a new binary value of 111011 (decimal 59). Thus, if the data is to be shifted in a leftward direction, the flag bit that will result from the shift operation is in bit position 59 (this example presumes the operand size is large enough to include bit at this position).

It should be noted that the bit position index starts at bit 0, and ends with bit 63 (a total of 64 bits) for the embodiment shown in FIG. 2. In general, in most embodiments the bit index will begin at bit 0 and end at bit N−1, where N is the total number of bits.

Second logic circuit 224 is configured to determine the bit position of the flag bit by subtracting a value of binary 1 from the shift count value. Again, assume the shift count has a binary value of 000101 (decimal 5), indicating that the data is to be shifted 5 bit positions. Thus, after subtracting binary 1, the result is a binary value of 000100 (binary 4), indicating that the flag bit that will result from the shift operation is in the fourth bit position.

As previously noted, position circuit 220 is coupled to receive a left/right signal. More particularly, the left/right signal is received by selection circuit 226. If the left/right signal indicates that the data is to be shifted in a leftward direction, the output from first logic 222 is selected to propagate to the output of selection circuit 226. If the left/right signal indicates that the data is to be shifted in a rightward direction, the output from second logic circuit 224 is selected to propagate to the output of selection circuit 226. In this particular embodiment, the output of selection circuit 226 comprises six bits. Embodiments wherein the output comprises a greater or lesser number of bits are also possible and contemplated.

The output provided by position circuit 220 (which is the same as the output form selection circuit 226) may in turn be provided to selection circuits 205. In the embodiment shown, lower order bits (2:0 in this particular example) of the output of position circuit 220 are provided as selection signal to selection circuits 205. Each of selection circuits 205 is coupled to receive 8 data inputs and 3 select signals. Based on the state of the selection signals provided, each selection circuit 205 allows the state of one of the data inputs to be conveyed to the output, which is then provided to selection circuit 210.

Selection circuit 210 is also coupled to receive selection signals, which may be the higher order bits (5:3 in this example) from selection circuit 226. However, some of these signals may be masked by masking circuit 215 if the operand size of the data is less than the maximum operand size. In the embodiment shown, the maximum operand size is 64 bits. If the data to be shifted is only 32 bits wide, the most significant bit output from selection circuit 226 will be masked. Masking is accomplished in this particular embodiment by inverting any logic 1 to be masked into a logic 0. For example, if the data to be shifted is 32 bits wide, with a shift count of 000101 (5) and the data is to be shifted to the left, the output from selection circuit 226 will be 111011 (59), with the 3 lowest significant bits being provided to selection circuits 205. However, since the data is only 32 bits wide, the carry flag cannot be taken from bit position 59. Thus, masking circuit 215 will invert the most significant bit of the value so that the 3 most significant bits (which are provide to selection circuit 210) are 011, and thus the altered bit position is 011011, indicating that the flag bit is to be taken from the 27$^{th}$ position of the 32 bits of data.

Although not explicitly shown, masking circuit 215 may be coupled to receive an indication of the operand size for all instances of data that are received, and may mask higher order bits whenever the data size is less than the maximum operand size.

Based upon the selection signals received by selection circuits 205 and selection circuit 210, a flag bit is provided on the output of selection circuit 210. This flag bit is equivalent to the last bit to be shifted out during shift operations. However, by using various embodiments of the method and apparatus described herein, the flag bit may be obtained directly from the data to be shifted faster than it might otherwise be obtained by waiting until the shift operations (as well as any extra operations that might be required if the size of the data to be shifted is less than the maximum operand size).

As previously noted, circuit 200 also includes shifter 201. Shifter 201 is configured to perform the shifting operation on the received data. Due to the arrangement of circuit 200, shifter 201 may perform shifting operations in parallel with the obtaining and outputting of the flag bit.

Circuit 200 may be implemented in various devices. In one embodiment, circuit 200 may be implemented in the execution path of an x86 processor (e.g., within execution core 124 of the processor illustrated in FIG. 1). Shifter 201 may perform shift operations while flag generation circuit may generate a carry flag bit that may be produced from such operations in an x86 processor. Circuit 200 (or individual components thereof, such as flag generation circuit 202) may be implemented in other devices as well.

Figure 3:
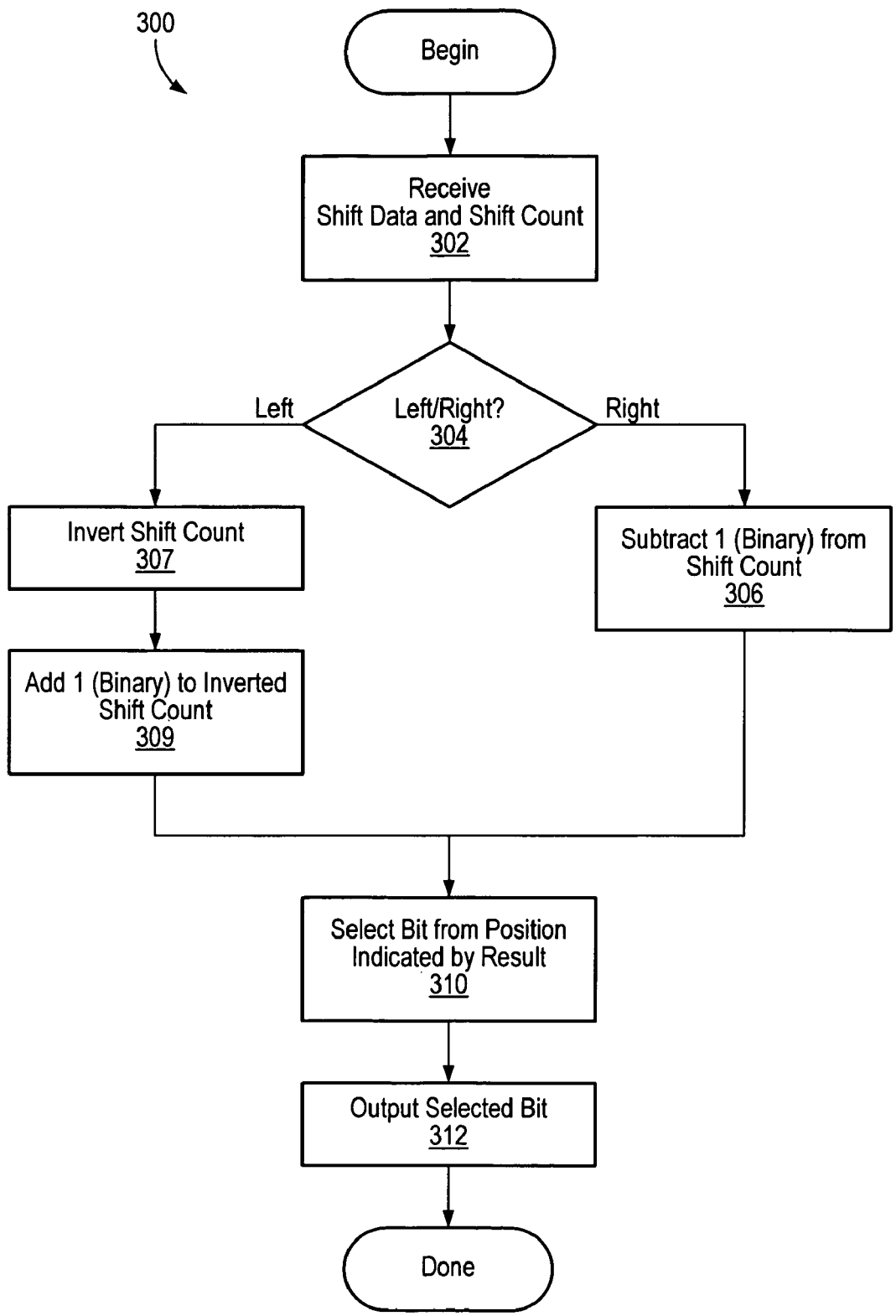
FIG. 3 is a flow diagram of one embodiment of a method for fast flag generation.

FIG. 3 is a flow diagram of one embodiment of a method for fast flag generation. Method 300 begins with the receiving of the data to be shifted and a shift count value (302). In addition to receiving the data and the shift count value, a left/right indication is also received (304).

If the left/right indication signals that the data is to be shifted in a leftward direction, the bits comprising the shift count value are inverted (307). Following this inversion, a value of binary 1 is added to the inverted value (309). If the left/right indication signals that the data is to be shifted in a rightward direction, a value of binary 1 is subtracted from the shift count value (306). The result produced in either case serves as an indication of the bit position of flag bit. Thus, the result is used to select the bit at the indicated position (310). Once selected, this bit may be output as the flag bit (312).

Method 300 may be performed by various embodiments of the circuit shown in FIG. 2. It is also noted that the data received in 302 may be shifted in parallel with the performing of method 300.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method comprising:
receiving, in a processor core, data to be shifted, wherein the data includes a first plurality of bits;
receiving a shift count value including a second plurality of bits, wherein the shift count value represents a number of bit positions the data is to be shifted;
receiving an indication of a direction the data is to be shifted;
determining, by way of circuitry within the processor core, a bit position of a flag bit within the first plurality of bits based on the shift count value and the direction, wherein, when the data is to be shifted in a leftward direction, the bit position of the flag bit is determined by inverting the second plurality of bits of the shift count and adding a value of binary 1, and wherein, when the data is to be shifted a rightward direction, the bit position of the flag bit is determined by subtracting a value of binary 1 from the shift count value; and
outputting the flag bit.

2. The method as recited in claim 1, wherein the first plurality of bits has a maximum number of bits corresponding to a maximum operand size.

3. The method as recited in claim 2 further comprising masking one or more higher order bits of an indication of the bit position when an operand size of the data to be shifted is less than the maximum operand size.

4. The method as recited in claim 1 further comprising shifting the data.

5. The method as recited in claim 4, wherein said receiving data, said receiving a shift count value, said receiving an indication, said determining, and said outputting is performed in parallel with said shifting the data.

6. The method as recited in claim 1, wherein the flag bit is a carry flag.

7. A circuit comprising:
a plurality of selection circuits, wherein a subset of the plurality of selection circuits is coupled to receive data to be shifted, wherein the data comprises a first plurality of bits; and
a position circuit, wherein the position circuit is coupled to receive a shift count value comprising a second plurality of bits, the shift count value representing a number of bit positions the data is to be shifted, and an indication of a direction the data is to be shifted;
wherein the position circuit is configured to:
determine a bit position of the flag bit by inverting the shift count value and adding a value of binary 1 if the data is to be shifted in a leftward direction; and
determine the bit portion of the flag bit by subtracting a value of binary 1 from the shift count value if the data is to be shifted in a rightward direction; and
wherein the selection circuits are coupled to receive an indication of the bit position from the position circuit and configured to select and output the flag bit based on the indication of the bit position, wherein the indication of the bit position comprises a third plurality of bits.

8. The circuit as recited in claim 7, wherein the first plurality of bits has a maximum number of bits corresponding to a maximum operand size.

9. The circuit as recited in claim 8 further comprising a masking circuit configured to mask one or more higher order bits of the indication of the bit position when an operand size of the data to be shifted is less than the maximum operand size.

10. The circuit as recited in claim 7, wherein the circuit further includes a shifter coupled to receive the data.

11. The circuit as recited in claim 10, wherein the shifter is configured to operate in parallel with the position circuit and the plurality of selection circuits.

12. The circuit as recited in claim 7, wherein the flag bit is a carry flag.

13. The circuit as recited in claim 7, wherein each of the plurality of selection circuits is a multiplexer.

14. The circuit as recited in claim 13, wherein selection signals provided to each of the plurality of multiplexers include one or more of the third plurality of bits.

15. The circuit as recited in claim 7, wherein the circuit is implemented in an execution path of a processor.

16. A circuit comprising:
a plurality of multiplexers, wherein each of a subset of the plurality of multiplexers is coupled to receive a subset of a first plurality of bits, the first plurality of bits comprising data to be shifted, and wherein in one of the plurality of multiplexers is coupled to receive an output provided by each of the subset of the plurality of multiplexers;
a position circuit including:
a first logic circuit, wherein the first logic circuit is coupled to receive a shift count value comprising a second plurality of bits, wherein the first logic circuit is configured to invert the second plurality of bits and add a value of binary 1;
a second logic circuit coupled to receive the shift count value, wherein the second logic circuit is configured to subtract a value of binary 1 from the second plurality of bits; and
a selection circuit, wherein the selection circuit is configured to receive a direction signal indicating if the first plurality of bits is to be shifted in a leftward or a rightward direction, and wherein, if the data is to be shifted leftward, select an output provided by the first logic circuit, and wherein, if the data is to be shifted rightward, select an output from the second logic circuit, and wherein an output from the selection circuit comprises a third plurality of bits; and
a masking circuit, wherein the masking circuit is coupled to receive a higher order subset of the third plurality of bits, and further configured to mask one or more of the subset of the third plurality of bits if an operand size of the data to be shifted is less than a maximum operand size;
wherein the subset of multiplexers is coupled to receive, as selection signals, a lower order subset of the third plurality of bits and the one of the plurality of multiplexers is configured to receive as selection signal outputs from the masking circuit, and wherein, based on the selection signals received, one of the first plurality of bits is allowed to propagate through the plurality of multiplexers and is output as a carry flag.

17. The circuit as recited in claim 16 further comprising a shifter circuit, wherein the shifter circuit is coupled to receive the data to be shifted, and further configured to shift the data a number of bit positions indicated by the shift count value in the direction indicated by the direction signal.

* * * * *